United States Patent
Haacke et al.

(10) Patent No.: US 10,871,587 B2
(45) Date of Patent: Dec. 22, 2020

(54) SEISMIC DATA PROCESSING INCLUDING VARIABLE WATER VELOCITY ESTIMATION AND COMPENSATION THEREFOR

(71) Applicant: CGG SERVICES SAS, Massy (FR)

(72) Inventors: Ross Haacke, Reigate (GB); Robert Zietal, Crawley (GB)

(73) Assignee: CGG SERVICES SAS, Massy (FR)

( * ) Notice: Subject to any disclaimer, the term of this patent is extended or adjusted under 35 U.S.C. 154(b) by 640 days.

(21) Appl. No.: 15/542,718

(22) PCT Filed: Dec. 18, 2015

(86) PCT No.: PCT/IB2015/002545
§ 371 (c)(1),
(2) Date: Jul. 11, 2017

(87) PCT Pub. No.: WO2016/128786
PCT Pub. Date: Aug. 18, 2016

(65) Prior Publication Data
US 2018/0267189 A1  Sep. 20, 2018

Related U.S. Application Data

(60) Provisional application No. 62/114,110, filed on Feb. 10, 2015.

(51) Int. Cl.
*G01V 1/38* (2006.01)
*G01V 1/36* (2006.01)

(52) U.S. Cl.
CPC .............. *G01V 1/362* (2013.01); *G01V 1/38* (2013.01); *G01V 2210/47* (2013.01); *G01V 2210/532* (2013.01); *G01V 2210/58* (2013.01)

(58) Field of Classification Search
CPC ...... G01V 1/362; G01V 1/38; G01V 2210/47; G01V 2210/532
See application file for complete search history.

(56) References Cited

U.S. PATENT DOCUMENTS

| | | |
|---|---|---|
| 2,012,026 A | 8/1935 | Sunderland |
| 4,992,993 A | 2/1991 | Chambers |
| 5,532,976 A | 7/1996 | Schneider, Jr. |

(Continued)

FOREIGN PATENT DOCUMENTS

WO  2015028485 A2  3/2015

OTHER PUBLICATIONS

Brian Barley, "Deepwater problems around the world", The Leading Edge, Apr. 1999, pp. 488-494, vol. 18.

(Continued)

*Primary Examiner* — Janet L Suglo
(74) *Attorney, Agent, or Firm* — Patent Portfolio Builders PLLC

(57) ABSTRACT

Effects of time variability of water velocities in seismic surveys are addressed. Traveltime discontinuities in the input seismic data which are associated with the time-variable water velocities are determined. The input seismic data is transformed from a data space that contains the traveltime discontinuities into a model space which does not contain the traveltime discontinuities. Then the transformed seismic data is reverse transformed from the model space back into the data space.

14 Claims, 12 Drawing Sheets

(56) References Cited

U.S. PATENT DOCUMENTS

| | | | |
|---|---|---|---|
| 6,112,155 | A | 8/2000 | Pham |
| 6,799,118 | B2 | 9/2004 | MacKay |
| 6,826,501 | B1 | 11/2004 | Carvill |
| 7,321,526 | B2 | 1/2008 | Carvill et al. |
| 7,450,469 | B2 | 11/2008 | Moore |
| 7,496,452 | B2 | 2/2009 | Carvill |
| 8,437,218 | B2 | 5/2013 | Dragoset, Jr. et al. |
| 8,937,848 | B2 | 1/2015 | Wang et al. |
| 9,081,118 | B2 | 7/2015 | De Cacqueray et al. |
| 2008/0255762 | A1 | 10/2008 | Carvill |
| 2009/0285052 | A1 | 11/2009 | Wood |
| 2012/0026830 | A1* | 2/2012 | Wang ............... G01V 1/364 367/24 |
| 2012/0095690 | A1* | 4/2012 | Higginbotham ..... G01V 1/28 702/18 |

OTHER PUBLICATIONS

C. Lacombe et al., "Correction for Water Velocity Variations and Tidal Statics", EAGE 68th Conference & Exhibition, Vienna, Austria, Jun. 12-15, 2006, pp. 1-5.

C.P.A. Wapenaar et al., "Inverse extrapolation of primary seismic waves", Geophysics, Jul. 1989, pp. 853-863, vol. 54, No. 7.

C.V. Carvill, "A New Approach to Water Velocity Estimation and Correction", 71st EAGE Conference & Exhibition, Amsterdam, The Netherlands, Jun. 8-11, 2009, pp. 1-5.

Daniel Trad et al., "Latest views of the sparse Radon transform", Geophysics, Jan.-Feb. 2003, pp. 386-399, vol. 68, No. 1.

Kanglin Wang et al., "Direct Measurement of Water Velocity and Tidal Variations in Marine Seismic Acquisition", SEG Las Vegas 2012 Annual Meeting, Nov. 4-9, 2012, pp. 1-5.

Peter G. Stewart et al., "Solutions for Deep Water Imaging", SPG GeoHorizons, Jan. 2007, pp. 1-11.

Richard Wombell, "Water Velocity Variations and Static Corrections in 3D Data Processing", EAGE 59th Conference and Technical Exhibition, Geneva, Switzerland, May 26-30, 1997, pp. 1-2.

Rodney Calvert, "Insights and Methods for 4D Reservoir Monitoring and Characterization", 2005 Distinguished Instructor Short Course, Distinguished Instructor Series, No. 8, 2005, pp. 1-12.

Scott MacKay et al, "The impact of water-velocity variations on deepwater seismic data", The Leading Edge, Apr. 2003, pp. 344-350.

2Sheng Xu et al., "Global solution to water column statics: a new approach to an old problem", SEG Technical Expanded Abstracts, 2003, pp. 1885-1888.

T.S. Durrani et al., "The Radon transform and its properties", Geophysics, Aug. 1984, pp. 1180-1187, vol. 49, No. 8.

Examination Report in related/corresponding GB 1712525.3 dated Oct. 16, 2020 (the international search report referred to in the Examination Report has been made of record on Jul. 11, 2017, and US2012026830 was cited by the Examiner on Apr. 02, 2020).

* cited by examiner

SEISMIC DATA PROCESSING INCLUDING VARIABLE WATER VELOCITY ESTIMATION AND COMPENSATION THEREFOR

RELATED APPLICATION

The present application is a National Stage of PCT Application No. PCT/IB2015/002545, filed Dec. 18, 2015, which claims priority from U.S. Provisional Patent Application No. 62/114,110, filed Feb. 10, 2015, entitled "Variable Water Velocity Estimation and Full Wavefield Tau-Px-Py Correction" to Ross Haacke and Robert Zeital, the disclosure of which is incorporated herein by reference.

TECHNICAL FIELD

Embodiments of the subject matter disclosed herein generally relate to methods and systems for seismic data processing and, more particularly, to mechanisms and techniques for estimating water velocities in the areas in which a seismic survey are performed, which velocities will typically vary over time, and then using the estimated water velocities to compensate or adjust the seismic data during the survey. The compensated seismic data can then be used to generate an image of the Earth's subsurface from which those skilled in the art can judge the presence or status of hydrocarbon deposits in the imaged region.

BACKGROUND

Marine seismic surveys are typically acquired over periods of weeks and months. During this time the source vessel will traverse the survey area numerous times in a pattern dictated by logistics and practical constraints on the acquisition. Consequently, data from source positions that are adjacent in the constant cross-line direction (on different sail-lines, or source-vessel traverses) can be acquired with significant periods of intervening time. Furthermore, repeated surveys used to monitor the effects of fluid injection or petroleum production in a time-lapse sense, i.e., so-called 4D seismic surveys, can attempt to repeat source positions many years after the original baseline survey. In-between the baseline and monitor surveys, and in-between the acquisition of adjacent sail-lines within each of these surveys, changes in salinity and temperature cause variations in the velocity of waves in the ocean.

Variation in water velocity, in turn, creates traveltime discontinuities in the recorded seismic data when compared across shots, and can reduce the accuracy of data processing and imaging, affecting the quality of the final image of the subsurface. Worse, where data are acquired for time-lapse monitoring, variations in water velocity can lead to large differences in the data that can mask the differences related to petroleum production that are targeted by the monitoring. The water-velocity variations create noise in the final 4D difference image (a difference of subsurface images created from the baseline and monitor surveys). The impact of water-velocity change can be significant in deep-water areas, where velocity changes as high as 10 m/s can create data discontinuities up to 10-30 ms in time. The fidelity of the final subsurface image, particularly in 4D, depends on the accuracy with which the recorded seismic data can be corrected to remove the effects of the water velocity variations. Ideally, the recorded data would be reduced to a state equivalent to the data which would have been acquired in a stationary water-column (one which does not change in time). Subsequently, the reduced data is consistent with the processing and imaging algorithms used to produce a subsurface image, and the final image itself is improved.

Reducing the recorded data to a state equivalent to the data which would have been acquired in a stationary water column, however, first requires the capability to accurately estimate the water velocity variations that are being experienced during the seismic survey(s). Water-column velocity can be estimated directly by traveltime analysis of the seabed reflection, or of the direct-arrival in data recorded with sensors placed on the seabed, see, e.g., Mackay, S., Fried, J., Carvill, C., "The Impact of Water-Velocity Variations on Deepwater Seismic Data", The Leading Edge, vol. 22, pp. 344-350, (2003) and Lacombe, C., Schultzen, J., Butt, S., Lecerf, D., "Correction for Water Velocity Variations and Tidal Statics." 68th EAGE Conference & Exhibition, (2006). This may be done, for example, using known techniques to measure the stacking velocity, or using tomographic inversions. Alternatively, indirect estimates of water-velocity variations may be made using the time-shift between observed water-bottom reflection times and a model of the same reflection times without discontinuities created by the water-velocity variations. The model water-bottom reflection times could be a smoothed version of the observed times.

Once a time-series of water-velocity variations (or, equivalently, a series of time-shifts relative to the modelled water-bottom reflection time) have been estimated, the seismic data can be reduced to that recorded in a stationary water column. The simplest method is to vertically time-shift the recorded data according to the magnitude of the traveltime difference between the observed and modelled water-bottom traveltimes, e.g., as described in Wombell, R., "Water Velocity Variations and Static Corrections in 3D Data Processing", 59th EAGE Conference & Exhibition (1997) and Xu, S., Pham, D., "Global Solution to Water Column Statics: A New Approach to an Old Problem", SEG Technical Program Expanded Abstracts, pp. 1 885-1 888, (2003). This type of approach is called a 'static correction', or a 'cold-water static correction'. The term 'static' refers to the use of a constant time shift based on acquisition time alone, and often calculated for a vertical raypath through the water column.

However, seismic data contain arrivals from a wide range of raypaths, most of which travel obliquely through the water column. Consequently, the method of static correction is not considered accurate for much of the recorded data. Mackay et al. and Lacombe et al. thus describe methods for dynamic water-column corrections, which use normal-moveout type equations to correct the seismic data according to the acquisition time, the time of arrival after the source excitation, and the horizontal distance between the source and the receiver (the surface offset). Mackay et al. write an equation explicitly giving a relative time shift from the water-velocity variation in terms of the static (vertical raypath) time shift and the other quantities listed above. Lacombe et al. describe a workflow for normal-moveout correction at the measured (variable) water-column velocity, vertical time-shift, then reverse normal-moveout correction at the reference (stationary) water-column velocity.

The normal-moveout type approaches are attractive in that the moveout velocities can be measured from data acquired on a single sail-line, or sail-lines that are close together in acquisition time such that the water-velocity is approximately stationary. The data reduction takes place in similar groups of data. This is a simplified but more practically useful version of the general approach outlined by Calvert, R. in "Insights and Methods for 4D Reservoir Monitoring and Characterization", Distinguished Instructor Short Course, 8, Society of Exploration Geophysicists (2005), in which data are extrapolated to the water-bottom using the water velocity appropriate for the acquisition time, then extrapolated back to the acquisition surface using the reference velocity. Nevertheless, the normal-moveout type approach cannot correctly describe the details of complex data, with backscattered energy, non-hyperbolic arrivals and other complexities not modelled by the normal-moveout equations.

The extrapolation method described in terms of a migration by Calvert (2005) and also by Mackay et al. (2003) is a more accurate method for reducing data, but is not at all straightforward. The water-velocity variations cannot be described easily in a migration operator, and the extrapolation requires a summation over the source or receiver array in both the in-line (constant sail-lines) and cross-line (different sail-lines) directions in order to be accurate in 3D. Therefore, the summation must include data with discontinuities created by the water-velocity variations, but cannot easily model them in the migration or extrapolation operator.

Accordingly, it would be desirable to provide systems and methods that avoid the afore-described problems and drawbacks, and which incorporate water-velocity variations in a migration or extrapolation operator as part of a process involving both water velocity estimation and applying the water velocity estimates to a process for improving the technology associated with recorded seismic data and images of the subsurface which are generated from the seismic data.

SUMMARY

According to an embodiment, a method, stored in a memory and executing on a processor, for correcting input seismic data for time-variable water velocities includes the steps of: determining traveltime discontinuities in the input seismic data which are associated with the time-variable water velocities; transforming the input seismic data from a data space that contains the traveltime discontinuities into a model space which does not contain the traveltime discontinuities; and reverse transforming the transformed seismic data from the model space back into the data space.

According to another embodiment, a computer system programmed to correct input seismic data for time-variable water velocities includes at least one memory device configured to store the input seismic data and computer program instructions; and at least one processor for executing the computer program instructions to: determine traveltime discontinuities in the input seismic data which are associated with the time-variable water velocities; transform the input seismic data from a data space that contains the traveltime discontinuities into a model space which does not contain the traveltime discontinuities; and reverse transform the transformed seismic data from the model space back into the data space.

According to another embodiment, a method for generating a time series of perturbed scalars which represent depth-insensitive time variability of water velocities in a region which has been surveyed to generate recorded seismic data, the method includes the steps of multiplying a perturbation function by a reference velocity to produce a depth-dependent velocity perturbation function, determining a maximum likelihood perturbation scalar associated with said depth dependent velocity perturbation function for each of a plurality of shots associated with the recorded seismic data taken at different acquisition times, by minimising a cost function of travel time residuals; and averaging the resulting plurality of perturbation scalars to generate the time series of perturbed scalars which represent the depth-insensitive time variability of water velocities.

According to another embodiment, a computer system programmed to generate a time series of perturbed scalars which represent depth-insensitive time variability of water velocities in a region which has been surveyed to generate recorded seismic data, the system including at least one memory device configured to store the input seismic data and computer program instructions; and at least one processor for executing the computer program instructions to: multiply a perturbation function by a reference velocity to produce a depth-dependent velocity perturbation function, determine a maximum likelihood perturbation scalar associated with said depth dependent velocity perturbation function for each of a plurality of shots associated with the recorded seismic data taken at different acquisition times, by minimising a cost function of travel time residuals; and average the resulting plurality of perturbation scalars to generate the time series of perturbed scalars which represent the depth-insensitive time variability of water velocities.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6a depicts an ocean floor having significant depth variance across the shoot area, while FIG. 6b shows the perturbation scalars for all shots with offset up to 4 km plotted for a set of ocean bottom-nodes in the shoot area of FIG. 6a;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments described herein, methods and systems provide for characterizing water-velocity variations with a parameterization that is independent of the depth of the water column (e.g., not using velocity or time shifts explicitly). In this context the terms "water velocity" and "velocity" as used herein refer to the speed at which acoustic waves or signals generated by a source travel through the water. The water-velocity variations are incorporated in an extrapolation operator such that discontinuous seismic data can be reduced to the equivalent seismic data recorded with a stationary water column. The extrapolation operator can then be used in various manners to compensate the recorded seismic data for temporal variations in water velocity including, for example, simultaneous reduction of primary and surface-multiple reflections (i.e. those which have respectively propagated through the water column one time or multiple times).

Figure 1:
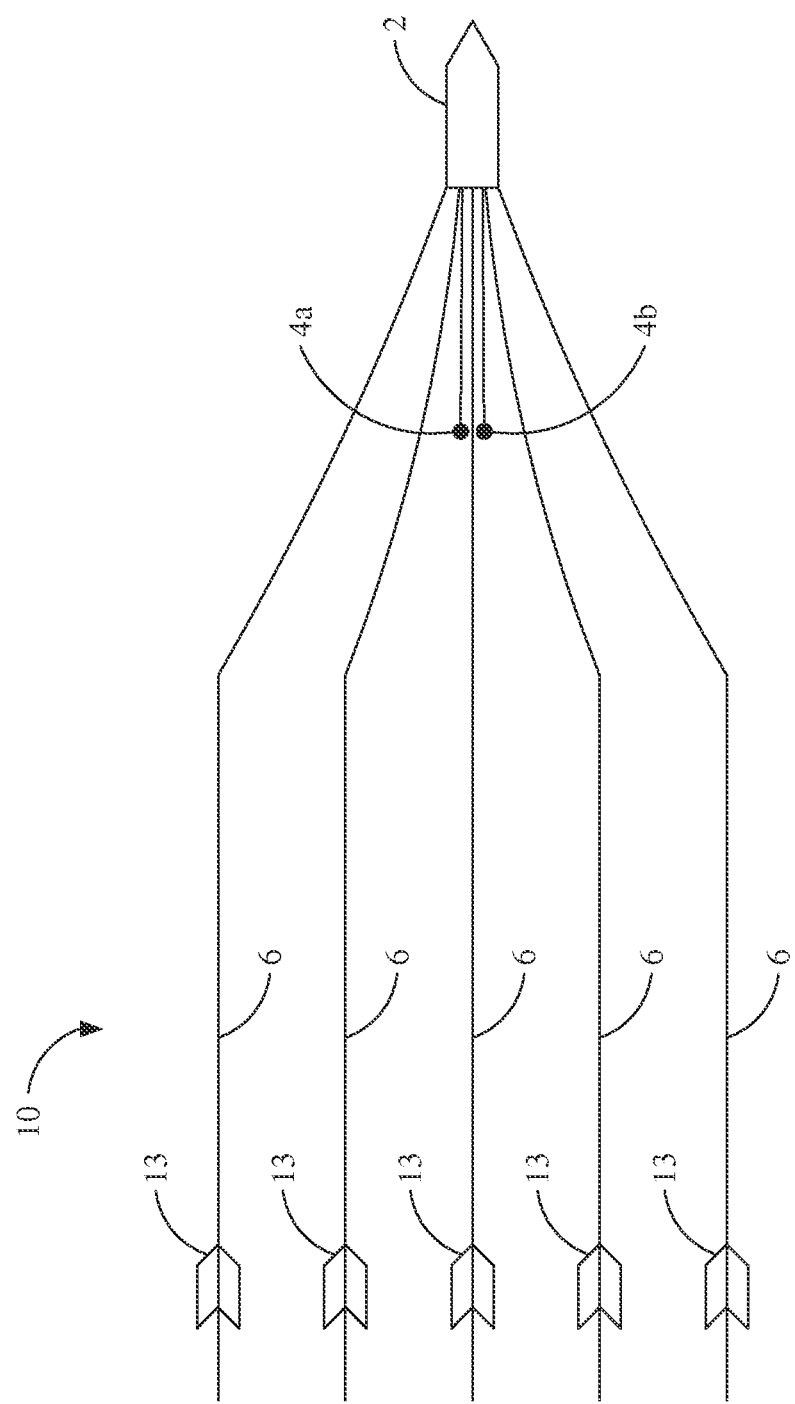
FIGS. 1 and 2 show various aspects of a marine seismic survey system.

In order to provide some context for these embodiments related to the processing of the collected seismic data after compensation for water velocity variations and the generation of seismic images based on the processed seismic image data, consider first a marine seismic data acquisition process and system as will now be described with respect to FIGS. 1 and 2. Those skilled in the art will appreciate, however, that the following embodiments can be used along with other types of seismic data acquisition systems, e.g., ocean-bottom cables (OBC) or ocean-botton nodes (OBN). In FIG. 1, a seismic data acquisition system 10 includes a ship 2 towing plural streamers 6 that may extend over kilometers behind ship 2. Each of the streamers 6 can include one or more birds 13 that maintains streamer 6 in a known fixed position relative to other streamers 6, and the birds 13 are capable of moving streamer 6 as desired according to bi-directional communications birds 13 can receive from ship 2.

One or more source arrays 4a,b may be also towed by ship 2 or another ship for generating seismic waves. Source arrays 4a,b can be placed either in front of or behind receivers 14, or both behind and in front of receivers 14. The seismic waves generated by source arrays 4a,b propagate downward, reflect off of, and penetrate the seafloor, wherein the refracted waves eventually are reflected by one or more reflecting structures (not shown in FIG. 1) back to the surface (see FIG. 2, discussed below). The reflected seismic waves propagate upwardly and are detected by receivers 14 provided on streamers 6. The seismic waves then reflect off of the free surface 46, i.e., the surface of the body of water (see FIG. 2, discussed below), travel downward and are once again detected by receivers 14 provided on streamers 6 as receiver ghosts. This process is generally referred to as "shooting" a particular seafloor area, as each time the sources generate an acoustic wave this is referred to as a "shot", with the seafloor area referred to as a "cell" and the sea surface referred to as a "free surface."

Figure 2:
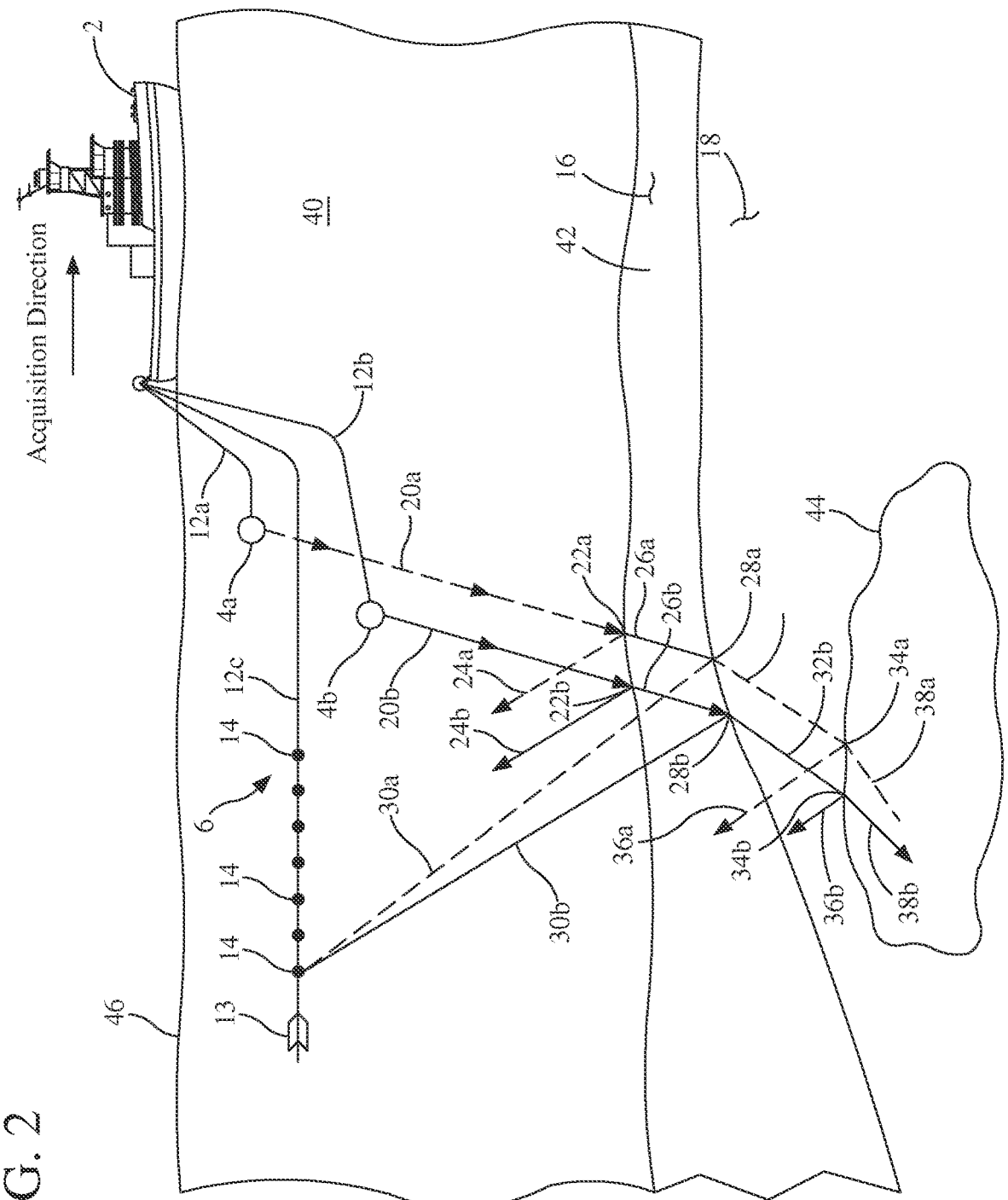

FIG. 2 illustrates a side view of the data acquisition system 10 of FIG. 1. Ship 2, located on ocean surface 46, tows one or more streamers 6, that is comprised of cables 12, and a plurality of receivers 14. Shown in FIG. 2 are two sources 4a,b attached to respective cables 12a,b. Each source 4a,b is capable of transmitting a respective sound wave, or transmitted signal 20a,b. For the sake of simplifying the drawings, only a first transmitted signal 20a will be shown (even though some or all of sources 4 can be simultaneously (or not) transmitting similar signals 20). First transmitted signal 20a travels through ocean 40 and arrives at first refraction/reflection point 22a. First reflected signal 24a from first transmitted signal 20a travels upward from ocean floor 42, back to receivers 14.

Thus, as shown in FIG. 2, first transmitted signal 20a generates first reflected signal 24a, and first refracted signal 26a. First refracted signal 26a travels through sediment layer 16 (which can be generically referred to as first subsurface layer 16) beneath ocean floor 42, and can now be considered to be a "new" transmitted signal, such that when it encounters a second medium at second refraction/reflection point 28a, a second set of refracted and reflected signals 32a and 30a, are subsequently generated. Further, as shown in FIG. 2, there happens to be a significant hydrocarbon deposit 44 within a third medium, or solid earth/rock layer 18 (which can be generically referred to as second subsurface layer 18). Consequently, refracted and reflected signals are generated by the hydrocarbon deposit, and it is the purpose of data acquisition system 10 to generate data that can be used to discover such hydrocarbon deposits 44.

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples (or ghosts). A surface multiple signal is one such example of a multiple, however there are other ways for multiples to be generated. For example, reflections form the surface can travel back down to the receivers and be recorded as ghosts. Multiples (and ghosts) may contain useful information about the geology beneath the ocean floor, and thus it is desirable to process multiples with the same objective as primaries. Accordingly, after discussing embodiments which estimate water velocity variations, other embodiments will be presented which correct primaries and/or multiples using the estimated water velocity variations.

Figure 3A:
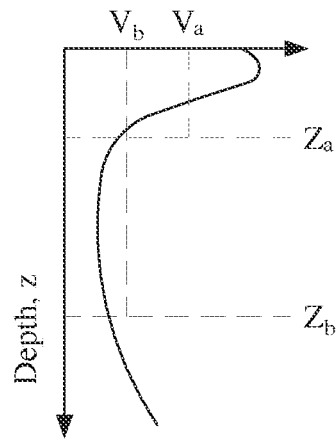
FIG. 3a is a plot of reference velocity versus water depth.

Water-velocity variations are usually characterised by measuring the velocity of the water, or by measuring the time shift of the observed water-bottom reflection to a modelled reflection with no changes in water velocity. However, where the water velocity profile is depth dependent (i.e. not a constant velocity for the full water depth), the velocity measured using the water-bottom reflection is an average for the overlying water. The measured water velocity is thus a function of the depth of the water-bottom itself. So too, the time shift is also a function of the water depth. This is illustrated in FIG. 3a, in which the average velocities va and vb are evaluated from water-bottom reflections at water-bottom depths za and zb. More specifically, oceanic water velocity is a function of temperature and salinity, both of which vary with depth. Typically a deep-water velocity profile takes the shape depicted in FIG. 3a. The water velocity measured from a water-bottom reflection is an average velocity for the overlying water column. Hence, the measured water velocity depends on the depth of the water at the point of measurement. For example, at depth $z_a$, the measured velocity is $v_a$, while at depth $z_b$ the measured velocity is $v_b$, where $v_a \neq v_b$.

Figure 3B:
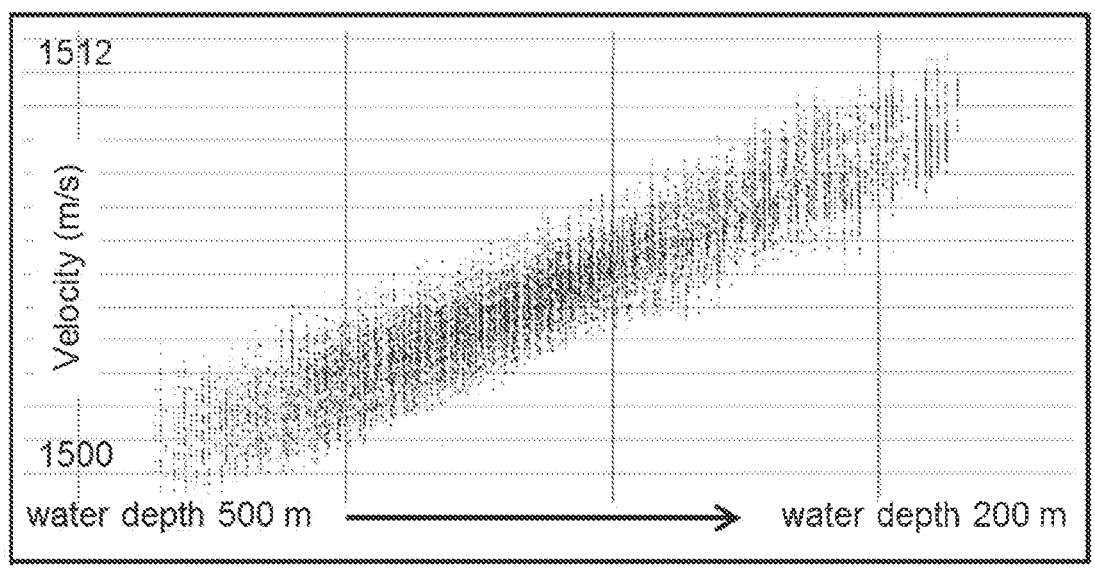
FIG. 3b is an example of measured velocity versus water depth.

In FIG. 3b, an example of water-velocity measurements from ocean-bottom node data acquired on a variable depth water-bottom shows strong correlation between measured velocity and water depth at the receiver. Consequently, velocity measurements cannot be averaged with measurements from other locations (in a shot-gather, for example). This averaging might take place in common-shot gathers, or in groups of data for which the acquisition time is within a few hours, so that the water-velocity is approximately the same. An averaging process is advantageous since it allows a more accurate estimate of the water-velocity from a set of redundant noisy measurements. Hence, to enable water-velocity averaging, a different parameterisation of water-velocity change is required that is insensitive to the water depth at which the velocity is measured.

Figure 4:
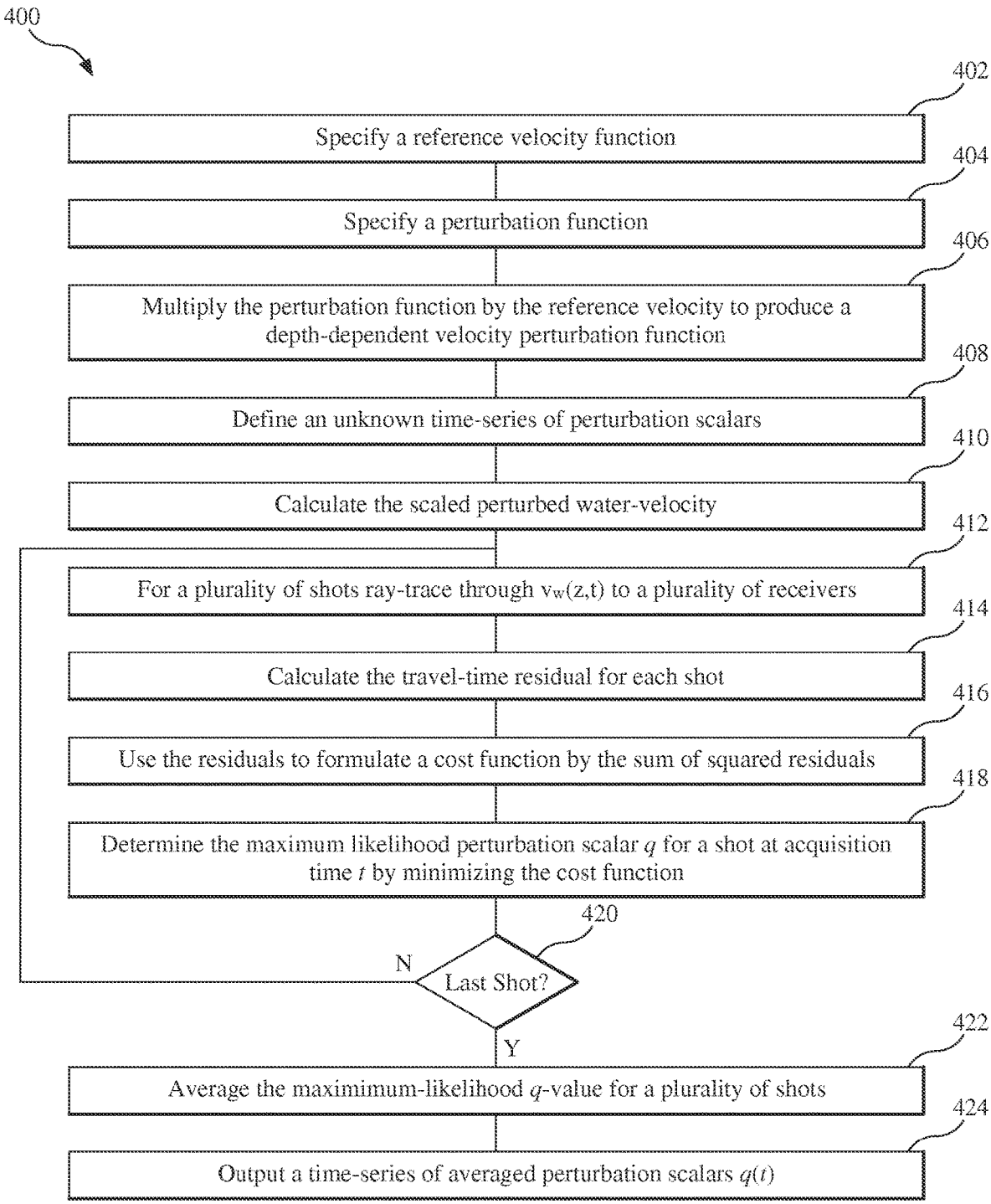
FIG. 4 is a flowchart illustrating a method for estimating water velocity variations according to an embodiment.
Figure 5A:
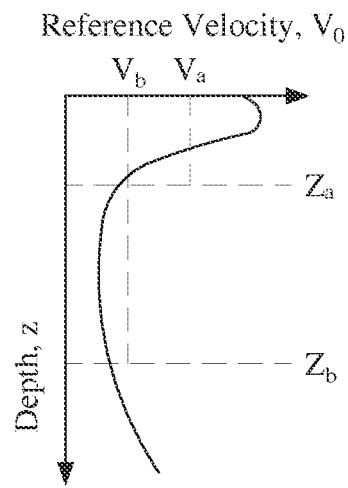
FIG. 5a depicts a depth dependent reference velocity function.
Figure 5B:
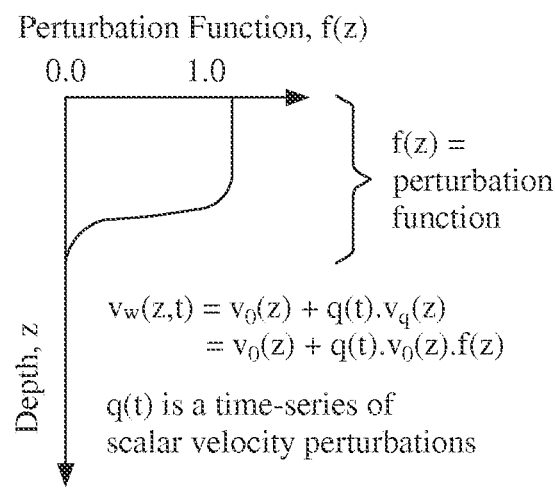
FIG. 5b depicts a depth dependent perturbation velocity function.

According to embodiments, water velocity estimation is performed using a parameterization of water velocity change that is insensitive to the water depth, an example of which is provided in the flow diagram of FIG. 4. Therein, a depth-insensitive and accurate measure of water-velocity can be formulated by the illustrated steps of a method or algorithm 400. At step 402, a reference velocity function, $v_0(z)$, is specified which is stationary (i.e., doesn't change with time, t) but may vary with depth, z (e.g. FIG. 5a). At step 404, a depth-dependent perturbation function, f(z), is specified (e.g., FIG. 5b). Canonical examples of perturbation functions which can be specified in step 404 include a tapered step function from 1 to 0 in a user-defined depth range. Another canonical example is a constant value of 1 at all depths. The selection of a particular perturbation function to be used to estimate water velocity variations according to this embodiment can, for example, be made based on empirical observations of the depth at which velocity changes primarily occur.

Figure 5C:
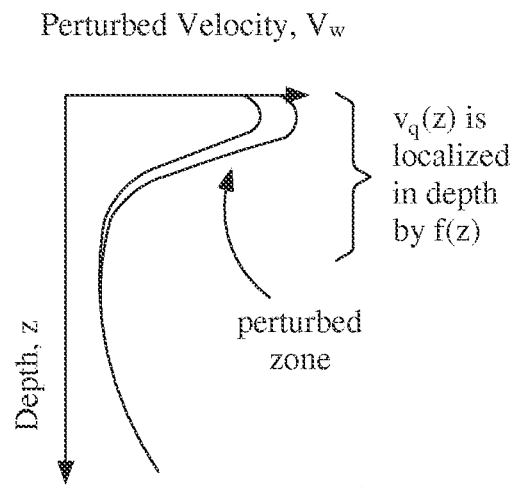
FIG. 5c depicts a combination of the depth dependent reference velocity function of FIG. 5a with the depth dependent perturbation velocity function of FIG. 5b.

At step 406, the perturbation function is multiplied by the reference velocity to produce a depth-dependent velocity perturbation function, $v_q(z) = v_0(Z) \cdot f(z)$, an example of which is illustrated in FIG. 5c. More specifically, the perturbed velocity function $v_q(z) = v_0(z) \cdot f(z)$ is calculated and added to the reference velocity with a time-dependent scaling q(t). The net water-velocity $v_w(z,t) = v_0(z) + q(t) \cdot v_0(z) \cdot f(z)$ is a function of depth and acquisition time, t. The depth-independent parameter q(t) can be averaged in blocks of t to stabilise the water-velocity measurement in that block of acquisition time.

At step 408, an unknown time-series of perturbation scalars q(t) is defined, then at step 410, for a range of q-values within which the water-velocity variations are to be described, the perturbed water-velocity, $v_w$, as a function of depth and acquisition time, is calculated according to $v_w(z,t) = v_0(z) + q(t) \cdot v_0(z) = v_0(z) + q(t) \cdot v_0(z) \cdot f(z) = v_0(z) \cdot (1 + q(t) \cdot f(z))$.

At step 412, for all (or a selection of) shots recorded within a user-defined period of acquisition time t, ray-trace through $v_w(z,t)$ in step 410 to all (or a selection of) receivers. The travel-time residual for each shot is calculated, at step 414, as the difference between the observed water-bottom reflection times (or direct-arrival times in the case of ocean-bottom sensors) and the predicted water-bottom reflection (or direct-arrival) times from ray-tracing. The residuals calculated in step 414 are used to formulate a cost function by the sum of squared residuals at step 416. Other forms of cost function may be used instead, such as the sum of the magnitudes of the residuals, or other norms commonly used by those skilled in the art of inversion and parameter estimation.

At step 418, the maximum likelihood perturbation scalar q for a shot at acquisition time t is determined by minimising the cost function derived in step 416. Steps 412-418 are iterated for all (or a selection of) shots in the survey as indicated by decision block 420. The maximum-likelihood q-value for shots gathered in user-defined periods of acquisition time in which the water-velocity variations are thought to be minimal are averaged at step 422. Examples of averaging periods include periods of a few hours, one day, or the time taken to acquire data on a single sail-line. Then, at step 424, a time-series of averaged perturbation scalars q(t) are output.

Figure 6A:
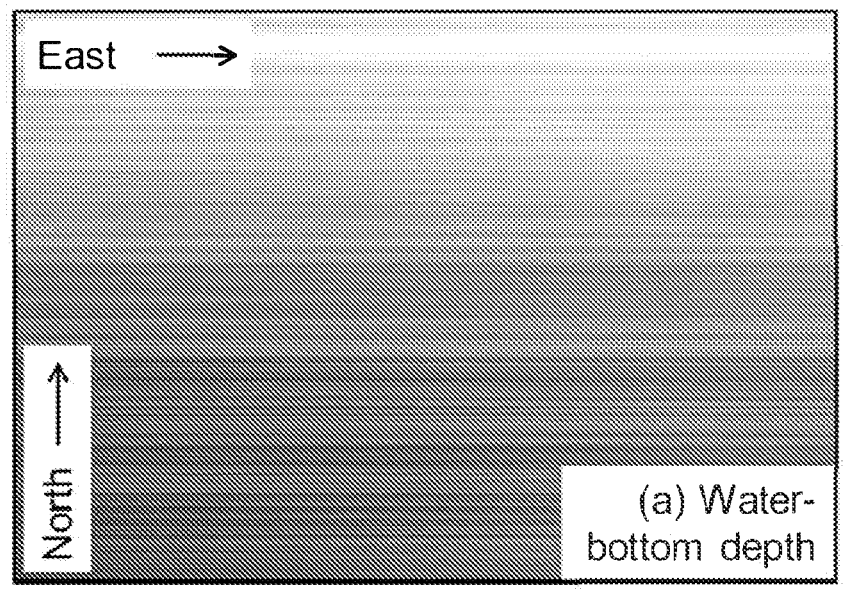
Figure 6B:
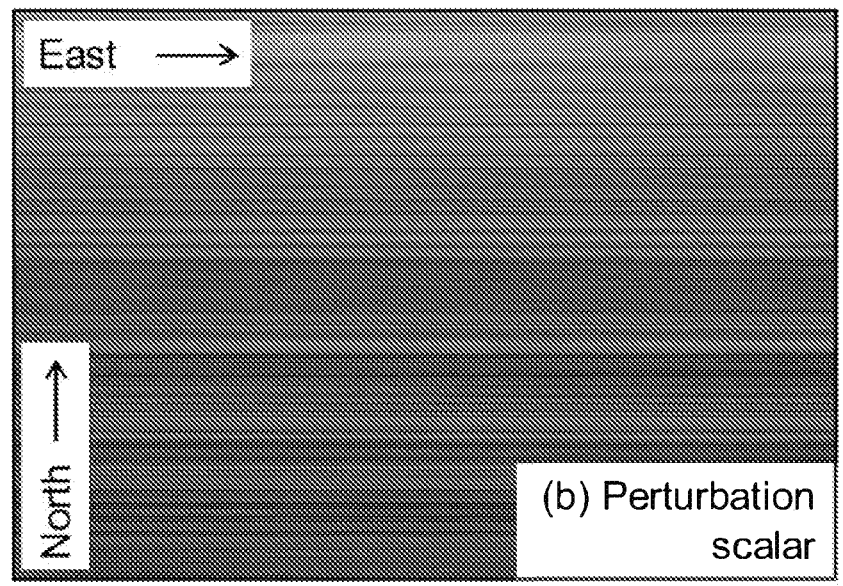

The use of a perturbation function according to this embodiment, with a perturbation scalar, removes the depth sensitivity of the quantity being averaged in step 422. The averaging of perturbation scalars can thus stabilise the measurement of water-velocity variations and produce a robust time-series with which the water velocity can be characterised. This benefit of using the perturbation function is illustrated in FIGS. 6a and 6b. FIG. 6a depicts an ocean floor having significant depth variance across the shoot area, while FIG. 6b shows the perturbation scalars for all shots with offset up to 4 km plotted for a set of ocean bottom-nodes in the shoot area of FIG. 6a. The q-values in FIG. 6b are clearly decoupled from water depth at the receiver or shot location. Consequently, averaging the q-values along sail-lines produces a stable and accurate characterisation of water-column velocity as a function of acquisition time.

Figure 7:
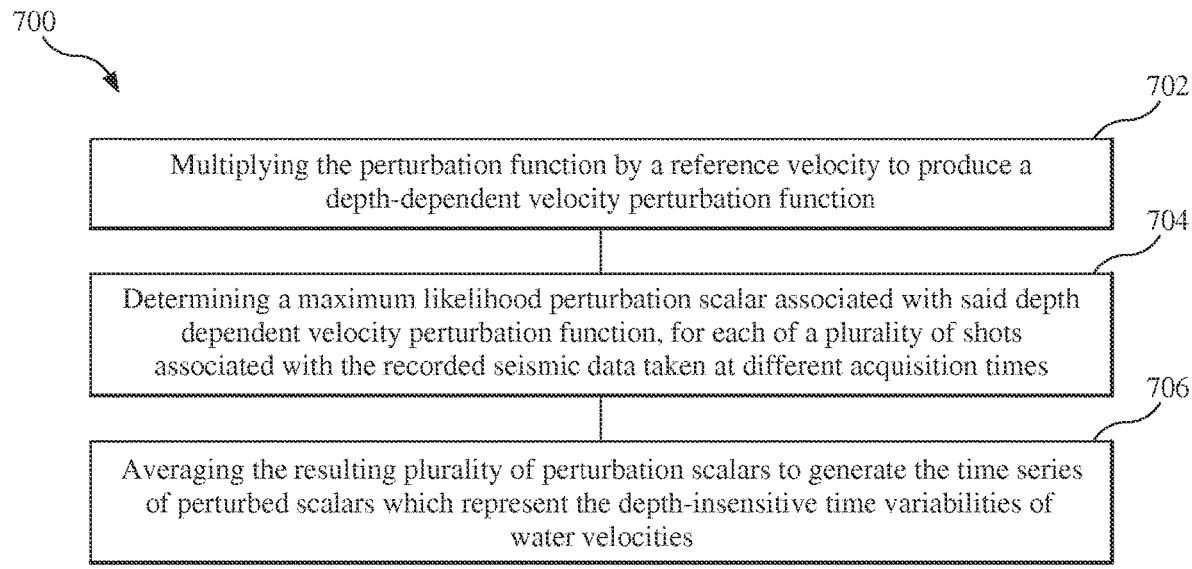
FIG. 7 is a flowchart illustrating a method for estimating water velocity variations according to another embodiment.

The method embodiment of FIG. 4 can be expressed more generally as indicated by the method embodiment illustrated in the flowchart of FIG. 7. Therein, a method 700 for generating a time series of perturbed scalars which represent depth-insensitive estimates of water velocities in a region which has been surveyed to generate recorded seismic data includes a step 702 of multiplying a perturbation function by a reference velocity to produce a depth-dependent velocity perturbation function. A maximum likelihood perturbation scalar associated with said depth dependent velocity perturbation function is determined, as step 704, for each of a plurality of shots associated with the recorded seismic data taken at different acquisition times. The resulting plurality of perturbation scalars are averaged at step 706 to generate the time series of perturbed scalars which represent the depth-insensitive estimates of water velocities.

Having described how to generate a time-series of averaged perturbation scalars which robustly characterises water velocity associated with recorded seismic data according to an embodiment, the discussion will now move to an embodiment which uses those averaged perturbation scalars to perform full wavefield correction for water velocity in a set of recorded seismic data. However, it should be noted that the following embodiments can, but need not, employ the particular embodiments described above for obtaining water velocity variation data, i.e., the embodiments of FIG. 4 or 7 can be used independently of the embodiment of FIG. 9 or 11 or vice versa. That is, the techniques described below can use other sources or techniques for determining water velocity variation data/operators than those described above.

The migration approach referred to above in the Background section and mentioned by Mackay et al. (2003) and Calvert (2005) is one of extrapolation through the water column using a time-variable water velocity, followed by extrapolation back to the acquisition surface using a stationary, reference, water velocity. If this is done accurately, properly incorporating the time-variable velocities in the extrapolation operator, the corrected data with stationary water-velocity profile is then consistent with the migration operator used to form an image of the subsurface. According to the following embodiment, this method is developed with explicit descriptions of how seismic data can be extrapolated through a time-variable water column using modifications to the tau-px-py operator.

A tau-px-py transform from data space $d(x,y,\omega)$ to model space $\psi(p_x, p_y, \omega)$ is achieved by computing:

$$\begin{pmatrix} \psi(p_{x_1}, p_{y_1}, \omega) \\ \vdots \\ \psi(p_{x_M}, p_{y_M}, \omega) \end{pmatrix} = \begin{pmatrix} \frac{g_1}{\tilde{g}} e^{i\omega(p_{x_1} x_1 + p_{y_1} y_1)} & \cdots & \frac{g_N}{\tilde{g}} e^{i\omega(p_{x_1} x_N + p_{y_1} y_N)} \\ \vdots & \ddots & \vdots \\ \frac{g_1}{\tilde{g}} e^{i\omega(p_{x_M} x_1 + p_{y_M} y_1)} & \cdots & \frac{g_N}{\tilde{g}} e^{i\omega(p_{x_M} x_N + p_{y_M} y_N)} \end{pmatrix} \begin{pmatrix} d(x_1, y_1, \omega) \\ \vdots \\ d(x_N, y_N, \omega) \end{pmatrix}, \quad (1)$$

where $\omega$ is temporal frequency, x and y are spatial positions for $1, \ldots, N$ data traces, $g_k$ is a data weight appropriate for the $k^{th}$ trace that helps correct for the irregular spatial distribution of data. The data weights are normalised by their sum, $\tilde{g}$. The complex exponential $e^{i\theta}$ for imaginary number i and phase angle $\theta$ is used to define a slanting path through the data, from which the summation along the $k^{th}$ row of the transform matrix produces the $k^{th}$ (for $k=1, \ldots, M$) coefficient $\psi$ in the model domain. The model-domain coefficients are evaluated for slownesses $p_x$ and $p_y$ that define the slant in the x and y spatial dimensions.

The taup-px-py operator in equation (1) enables the transformation from data to model space by evaluating $\psi = L^f d$. The operator $L^f$ has an adjoint, $L^r$, such that $d = L^r \psi$. Explicitly, $$\begin{pmatrix} d(x_1, y_1, \omega) \\ \vdots \\ d(x_N, y_N, \omega) \end{pmatrix} = \begin{pmatrix} \frac{g_1}{\tilde{g}} e^{-i\omega(p_{x_1} x_1 + p_{y_1} y_1)} & \cdots & \frac{g_1}{\tilde{g}} e^{-i\omega(p_{x_M} x_1 + p_{y_M} y_1)} \\ \vdots & \ddots & \vdots \\ \frac{g_N}{\tilde{g}} e^{-i\omega(p_{x_1} x_N + p_{y_1} y_N)} & \cdots & \frac{g_N}{\tilde{g}} e^{-i\omega(p_{x_M} x_N + p_{y_M} y_N)} \end{pmatrix} \begin{pmatrix} \psi(p_{x_1}, p_{y_1}, \omega) \\ \vdots \\ \psi(p_{x_M}, p_{y_M}, \omega) \end{pmatrix}. \quad (2)$$

The operators above in equation (2) are important for correcting water-velocity variations because they can be used to decompose the input data into plane waves in the model domain. The plane-wave decomposition allows a wavefield extrapolation to take place by phase-shifting the plane wave components according to a model of wave propagation in the water column.

With the foregoing background on general transformations in mind, embodiments will now be described whereby the seismic wavefield is extrapolated through a water column with time-variable velocities, and a method by which this is used to reduce seismic data to an equivalent dataset with stationary water column. The derivation of the formulae associated with these embodiments now follows, with a description of their incorporation into the tau-px-py operators described above in equation (2).

Figure 8:
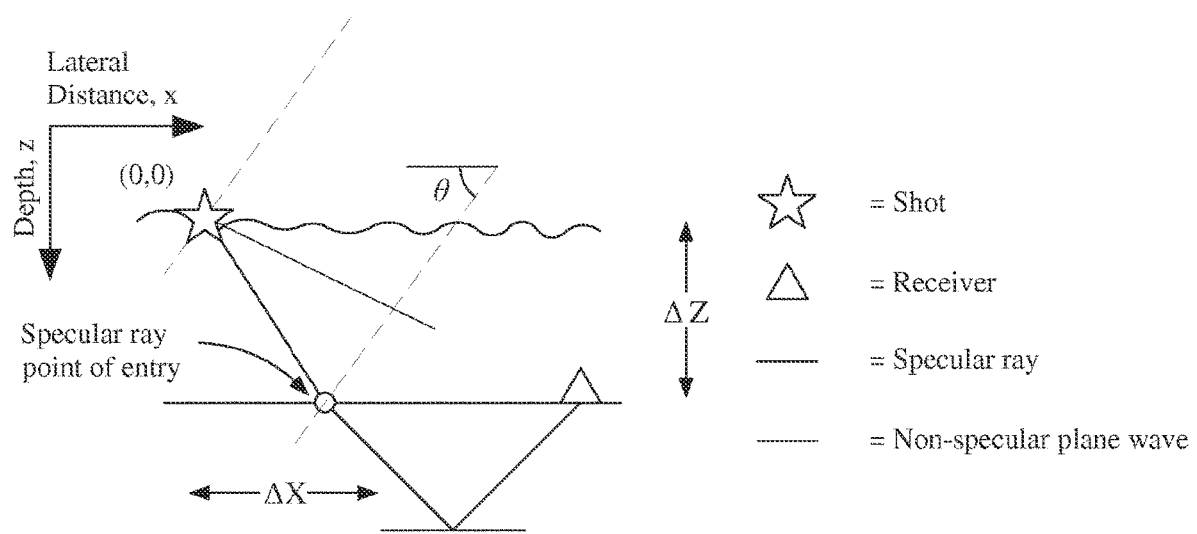
FIG. 8 illustrates a homogeneous 2D water column system.

The derivation for this embodiment considers plane waves redatumed through a homogeneous 2D water column for simplicity, with an extension to non-homogeneous 3D water column described further below. FIG. 8 illustrates a homogeneous 2D water column system which forms the basis for this derivation. Therein, a surface shot at point $(x,z)=(0,0)$ generates a wavefield propagating through the water to a receiver at point $(x_R, z_R)$. The wavefield may or may not propagate below the water-bottom for part of its path. A wave arriving at the receiver with some part of its path below the water-bottom is defined by its 'point of entry', the point at which the specular ray intersects the water-bottom. Waves arriving with no propagation below the water-bottom have a point of entry coincident with the receiver.

With this framework in mind, the wavefield generated at the source, at point $(x,z)=(0,0)$, gives rise to a plurality of arrivals at the receiver at point (x_R,z_R). Each arrival can be characterised by tracing a specular ray from the source to the receiver through an arbitrary velocity model. Plane waves leaving the source are extrapolated through the water-column to the point of entry of the specular ray $(\Delta x, \Delta z)$, at which the specular ray intersects the water-bottom in the reference water-column velocity. For the direct water wave, the point of entry is the receiver location. The extrapolation is achieved with a plane-wave phase shift, with the difference between the phase shift in the reference water velocity and the time-variable water velocity describing the traveltime discontinuity for the non-specular energy created by the source. It is the traveltime discontinuity that creates the water-column variations observed in the data. Thus, the water-column variations can be compensated by phase-shifting observed data by the difference in extrapolation times through the water column from the source to the point of entry. For reference velocity $v_0$ and perturbed velocity $v_q$ of the water at the time of the shot, the extrapolation times to the point of entry are $$t_e^0 = \Delta z p_z^0 + \Delta x p_x^0 \quad (3)$$

for the reference water velocity, and $$t_e^q = \Delta z p_z^q + \Delta x p_x^q \quad (4)$$

for the perturbed water velocity. Here, the horizontal slowness $p_x$ and the vertical slowness $p_z$ are indexed by the superscript 0 or q to indicate they are slownesses in the data for the reference water velocity or the perturbed water velocity respectively. Note that:

$$p_x^0 = \frac{\sin\theta_0}{v_0} \quad (5)$$

and $$p_x^q = \frac{\sin\theta_q}{v_q} \quad (6)$$

for emergent angle θ of the plane wave in the xz-plane at the source array, indexed with a subscript to represent the emergent angle in the reference or perturbed water velocity.

The traveltime discontinuity for the plane wave is then:

$$\Delta t_e = t_e^0 - t_e^q = \Delta z(p_z^0 - p_z^q) + \Delta x(p_x^0 - p_x^q). \quad (7)$$

Noting that $$(p_z^0)^2 = \frac{1}{v_0^2} - (p_x^0)^2 \text{ and } (p_z^q)^2 = \frac{1}{v_q^2} - (p_x^q)^2,$$

then (7) may be written $$\Delta t_e = \Delta z\left[\left(\frac{1}{v_0^2} - (p_x^0)^2\right)^{1/2} - \left(\frac{1}{v_q^2} - (p_x^q)^2\right)^{1/2}\right] + \Delta x(p_x^0 - p_x^q). \quad (8)$$

Assuming that $\sin \theta_0 = \sin \theta_q$, which is justifiable for small perturbations in water velocity from the reference, then $$p_x^0 - p_x^q \cong \sin\theta_0\left(\frac{1}{v_0} - \frac{1}{v_q}\right) = v_0 p_x^0\left(\frac{1}{v_0} - \frac{1}{v_q}\right) = p_x^0\left(1 - \frac{v_0}{v_q}\right). \quad (9)$$

Thus, $$p_x^q = p_x^0 \frac{v_0}{v_q}$$

and (8) can be re-written in terms of $v_0$, $v_q$, and $p_x^0$, which are the reference and perturbed velocities, and the horizontal slowness as measured in the equivalent data recorded with the reference water column. Substitution gives:

$$\Delta t_e = \Delta z\left[\left(\frac{1}{v_0^2} - (p_x^0)^2\right)^{1/2} - \left(\frac{1}{v_q^2} - (p_x^0)^2\left(\frac{v_0}{v_q}\right)^2\right)^{1/2}\right] + \Delta x\left(p_x^0 - p_x^0 \frac{v_0}{v_q}\right),$$

which simplifies to $$\Delta t_e = \frac{\Delta z}{v_0}\left[1 - (p_x^0 v_0)^2\right]^{1/2}\left(1 - \frac{v_0}{v_q}\right) + \Delta x p_x^0\left(1 - \frac{v_0}{v_q}\right). \quad (10)$$

Equation (10) describes the traveltime discontinuity observed in the data recorded at an acquisition time for which the water-velocity is $v_q$, potentially different to the reference water velocity $v_0$, or to water velocities for other acquisition times. The traveltime discontinuities caused by the variable water velocity can thus be corrected by calculating a plane-wave decomposition for the data and phase-shifting the plane waves according to equation (10) then re-combining the data in the original time-space domain.

Having described the technique for 2D, the embodiment will now be extended to 3D. In 3D the additional extrapolation dimension gives new terms derived similarly to those above. For spatial direction y and corresponding slowness $p_y$, the extrapolation to point of entry at $(x,y,z)=(\Delta x, \Delta y, \Delta z)$ gives plane-wave traveltime discontinuities as:

$$\Delta t_e = \frac{\Delta z}{v_0}\left[1 - \left(p_x^{0\,2} + p_y^{0\,2}\right)v_0^2\right]^{1/2}\left(1 - \frac{v_0}{v_q}\right) + [\Delta x p_x^0 + \Delta y p_y^0]\left(1 - \frac{v_0}{v_q}\right), \quad (11)$$

where it is assumed that $\sin \varphi_0 = \sin \varphi_q$ for plane-wave emergence angle $\varphi$ in the yz-plane and where $$p_y^0 = \frac{\sin\varphi_0}{v_0} \text{ and } p_y^q = \frac{\sin\varphi_q}{v_q}.$$

The use of horizontal slowness coordinates $p_x^0$ and $p_y^0$ allow the full wavefield to be corrected for the extrapolation-time difference. The procedure achieving this correction is application of a tau-px-py transform from data space that contains the traveltime discontinuities to model space that doesn't. This is implemented via a forward transform as:

$$\begin{pmatrix} \psi(p_{x_1}^0, p_{y_1}^0, \omega) \\ \vdots \\ \psi(p_{x_M}^0, p_{y_M}^0, \omega) \end{pmatrix} = \quad (12)$$

$$\begin{pmatrix} \frac{g_1}{\tilde{g}} e^{i\omega(p_{x_1}^0 x_1 + p_{y_1}^0 y_1)} e^{i\omega \Delta t_e(t_{a_1})} & \cdots & \frac{g_N}{\tilde{g}} e^{i\omega(p_{x_1}^0 x_N + p_{y_1}^0 y_N)} e^{i\omega \Delta t_e(t_{a_N})} \\ \vdots & \ddots & \vdots \\ \frac{g_1}{\tilde{g}} e^{i\omega(p_{x_M}^0 x_1 + p_{y_M}^0 y_1)} e^{i\omega \Delta t_e(t_{a_1})} & \cdots & \frac{g_N}{\tilde{g}} e^{i\omega(p_{x_M}^0 x_N + p_{y_M}^0 y_N)} e^{i\omega \Delta t_e(t_{a_N})} \end{pmatrix}$$

$$\begin{pmatrix} d(x_1, y_1, \omega, t_{a_1}) \\ \vdots \\ d(x_N, y_N, \omega, t_{a_N}) \end{pmatrix}$$

that incorporates the extrapolation-time difference into the plane-wave decomposition, according to the acquisition time $t_a$ at which the shot in the data vector is fired. This acquisition time determines the water-velocity $v_q$ via the perturbation series of q-values described above, and thus the time shift evaluated from equation (11) and present in equation (12) for that entry in the data vector. The point of entry of the specular ray can be estimated, with varying degrees of accuracy, using offset- and arrival-time dependent functions, ray-tracing or other methods. The formulation above is only moderately sensitive to the point of entry estimate, and thus allows considerable scope for approximations to be made in defining this quantity.

The application of equation (12) for the case of non-homogeneous water velocity is a generalization of the derivation outlined above. By dividing the water column into a set of layers or blocks of user-defined size, the extrapolation-time difference can be evaluated for each block once the path of the specular ray has been defined by ray-tracing. In that case, equation (11) is replaced by the summation $\Delta t_e = \Sigma_{j=1}^{N_j} \Delta t_{e_j}(\Delta x_j, \Delta y_j, \Delta z_j, v_{0_j}, v_{q_j})$ over $j=1, \ldots, N_j$ blocks of the water column. The formulation uses variable $\Delta x, \Delta y, \Delta z$ since they become the segment lengths of the ray-path of the specular ray in the $j^{th}$ block. Also $v_0$ and $v_q$ are functions of position in the water column, typically held constant within the block (the block-size may become arbitrarily small).

Once the transform from data to model is complete, the traveltime discontinuities are fully described inside the transform operator in equation (12). Hence, the model-domain representation of the data is free of these traveltime discontinuities, to the extent allowed by the accuracy of the water-velocity characterization and the point of entry approximations. The equivalent data-domain signal without traveltime discontinuities can be obtained by reverse transforming from model space to data space using the standard operator in equation (2) (i.e. switching off the effect of the water-velocity variations in the transform).

The correction of water-velocity variations in field data may be improved beyond performing a transform from data space to model space using equations (11) and (12) and then back using equation (2) according to another embodiment. This is because the transform is lossy, meaning that even the simpler case of transforming data with (1) and (2) does not produce $0=r=d-L'L^f d$. This issue is resolved by treating the estimation of the model domain signal as an inverse problem which must reverse transform to give the input data, meaning that $\|r\|_n \rightarrow \min$ for a n-norm on the data residual r. Thus, the procedure is to derive the model using a conjugate-gradient type solver, or other appropriate solvers, that reverse transforms to give the input data. In this case, the transform is made using:

$$\begin{pmatrix} d(x_1, y_1, \omega, t_{a_1}) \\ \vdots \\ d(x_N, y_N, \omega, t_{a_N}) \end{pmatrix} = \qquad (13)$$

$$\begin{pmatrix} \frac{g_1}{\tilde{g}} e^{-i\omega(p_{x_1}^0 x_1 + p_{y_1}^0 y_1)} e^{-i\omega \Delta t_e(t_{a_1})} & \cdots & \frac{g_1}{\tilde{g}} e^{-i\omega(p_{x_M}^0 x_1 + p_{y_M}^0 y_1)} e^{-i\omega \Delta t_e(t_{a_1})} \\ \vdots & \ddots & \vdots \\ \frac{g_N}{\tilde{g}} e^{-i\omega(p_{x_1}^0 x_N + p_{y_1}^0 y_N)} e^{-i\omega \Delta t_e(t_{a_N})} & \cdots & \frac{g_N}{\tilde{g}} e^{-i\omega(p_{x_M}^0 x_N + p_{y_M}^0 y_N)} e^{-i\omega \Delta t_e(t_{a_N})} \end{pmatrix}$$

$$\begin{pmatrix} \psi(p_{x_1}^0, p_{y_1}^0, \omega) \\ \vdots \\ \psi(p_{x_M}^0, p_{y_M}^0, \omega) \end{pmatrix}$$

from model space to data space, and its adjoint in equation (12) from data space to model space. Once the model-domain signal has been derived such that $\|r\|_n \rightarrow \min$, the final transform from the model to data domain is made using equation (2), outputting data without the traveltime discontinuities caused by water-velocity variations.

The inverse procedure described above involves the use of new operators shown in equations (12) and (13). The inversion can be implemented using techniques to increase the sparseness of the model domain (the focusing of model-domain energy to a smaller number of coefficients). The sparseness can be controlled by iteratively re-solving the system of equations after updating a set of model weights that help to localise and concentrate energy in the model domain.

One further benefit of these embodiments is thus to solve for a single or pair of models weighted by functions of a primary estimate and/or functions of a multiple estimate such that the weighted models are reverse transformed and combined to describe the input data. The primary and multiple weights can be produced by transforming the data-domain signal after a wavefield separation stage to separate primaries and multiples, or after any other method for estimating the multiple arrivals in the data (e.g. including SRME, predictive deconvolution in tx, tau-p or other domains, Greens-function modelling, or other unspecified methods). Separating the models with weighting functions appropriate for the primary arrivals or for the multiple arrivals allows the specular ray-path and the point of entry in equation (11) to be more accurately specified for each of the models. The first-order surface multiple arrivals, for example, may be extrapolated for vertical distance $3\Delta z$ in comparison to vertical distance $\Delta z$ for the primaries in equation (11). The result is the separate modelling of primary and multiple energy such that they reverse transform using the correct operators and recombine to give the observed input data. Again, the final model estimate is reverse transformed using (2) to give the equivalent data without water-velocity variations. The above procedure may be extended to the use of $i=1, \ldots, N_i$ models weighted by $i=1, \ldots, N_i$ weighting functions that represent primaries and/or up to $N_i$ orders of multiple arrival, with specular ray-paths and points of entry in equation (11) modified accordingly.

Based on the foregoing, a method 900 for correcting primaries (primary waves) in a seismic data set for time variable water velocities according to an embodiment will now be described with respect to the flow diagram of FIG. 9. Therein, at step 902, the point-of-entry for each datapoint in the data vector is approximated, using shot and receiver coordinates, arrival times, frequencies or selections in a dip-decomposed domain to make the approximations. Then, at step 904, the equations for the extrapolation-time difference represented in equation (11) above are formulated using the approximated points-of entry. Using a conjugate gradients solver, the model-domain signal which reverse transforms using equation (13) to describe the input data is estimated at step 906. For this latter step, the inversion may be performed using model-domain or data-domain regularisation, weights, or a range of possible combinations of model-domain or data-domain norms. Next, at step 908, the final transform is performed from model to data domain without time-variable water velocities, e.g., using the transform in equation (2).

Figure 9:
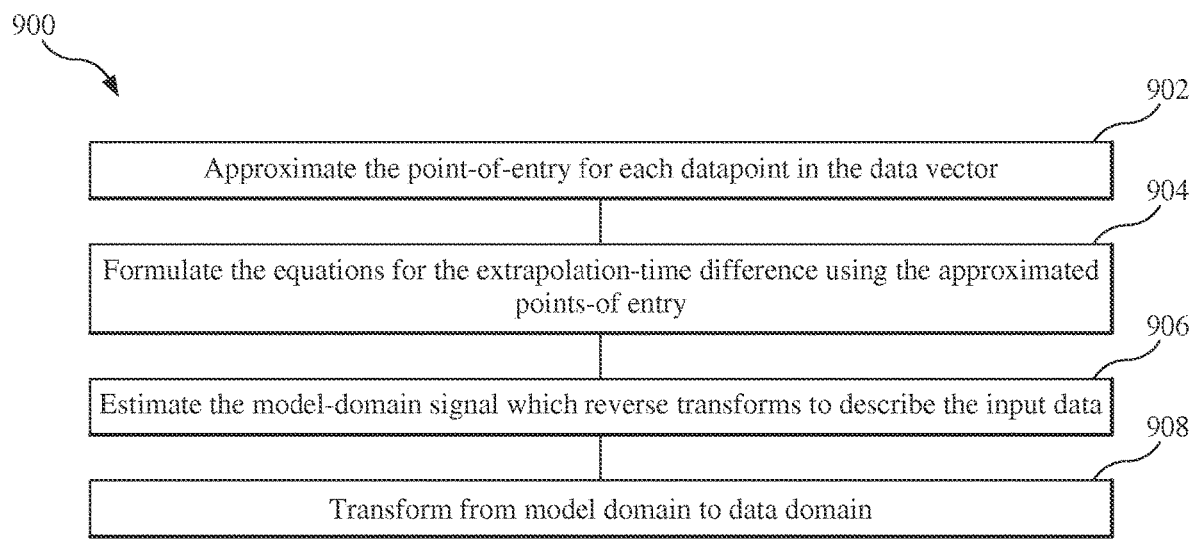
FIG. 9 is a flowchart illustrating a method for correcting primaries (primary waves) in a seismic data set for time variable water velocities according to an embodiment.
Figure 10A:
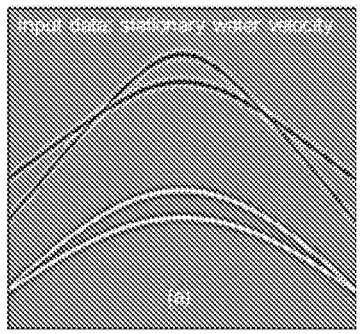
FIGS. 10a-10f depict a layercake synthetic model associated with application of the method of FIG. 9.
Figure 10B:
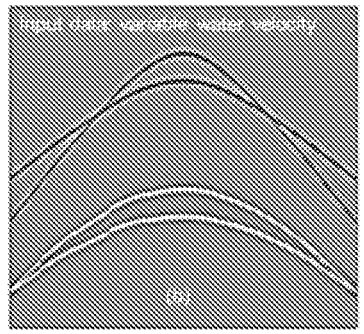
Figure 10C:
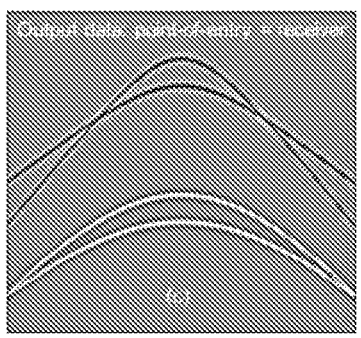
Figure 10D:
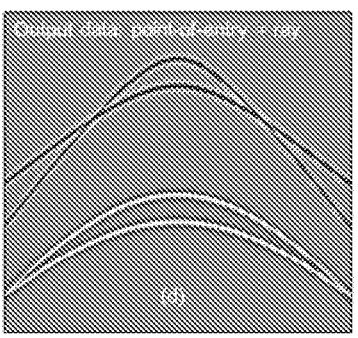
Figure 10E:
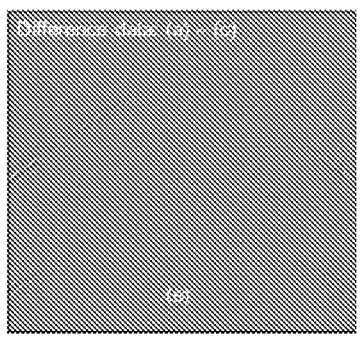
Figure 10F:
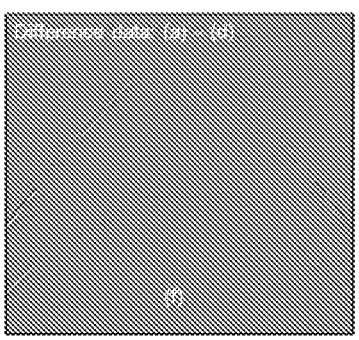

The method for correcting primaries described in the flowchart of FIG. 9 is illustrated using a layercake synthetic model in FIGS. 10a-10f. Therein, the seismic data associated with stationary water velocity is shown in FIG. 10a and the seismic data associated with time-variable water velocity is shown in FIG. 10b. Note the traveltime discontinuities are larger for the multiple arrivals (white peaks) compared with the primary arrivals (black peaks) due to the additional time spent propagating in the water. Correcting the data using a point of entry at the receiver correctly models the direct and multiple water waves as shown in FIG. 10c, while the point of entry for the specular ray correctly models the subsurface arrivals as shown in FIG. 10d. Differences with the ideal data shown in FIGS. 10e and 10f show the respective arrivals cancelling as expected.

Figure 11:
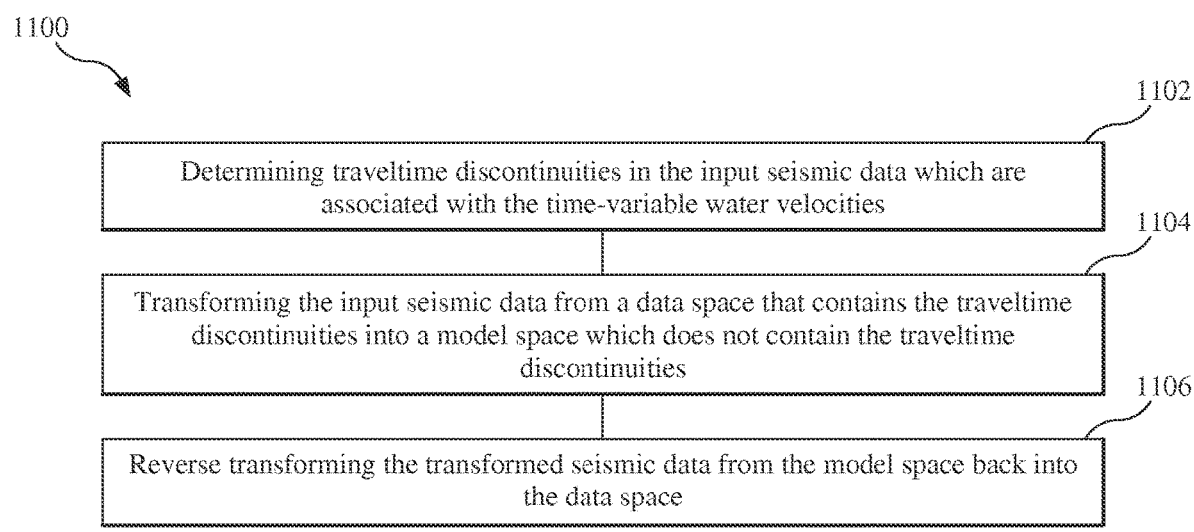
FIG. 11 is a flowchart illustrating a method for correcting seismic data for variation in water velocities according to another embodiment.

Of course, the methodology described above and with respect to FIG. 9 can be further generalized as illustrated in the flowchart of FIG. 11. Therein, a method 1100 for correcting input seismic data for time-variable water velocities includes the step 1102 of determining traveltime discontinuities in the input seismic data which are associated with the time-variable water velocities. The input seismic data is transformed, at step 1104 data from a data space that contains the traveltime discontinuities into a model space which does not contain the traveltime discontinuities. The transformed seismic data is reverse transformed from the model space back into the data space without traveltime discontinuities at step 1106.

Whereas the embodiment of FIG. 9 corrects for water velocity variations in the primaries in the seismic data set it is also possible, as mentioned earlier, for embodiments to simultaneously correct for water velocity variations in both primaries and multiples in the seismic data set by making certain modifications to the processing algorithm described in FIG. 9. For instance, the extrapolation-time difference of step 904 is modified to describe multiple arrivals, using a vertical extrapolation of $3\Delta z$, for example, and using the point-of-entry appropriate for the multiple arrivals. Then those modified extrapolation-time differences which are appropriate for primaries and multiples are used to create transform operators appropriate for that type of arrival.

Additionally, a set of model-domain weights are created that help separate primary and multiple arrivals during the inversion using iteratively re-weighted methods. The model-domain weights may be the transform to model space of a multiple model, and the multiple model subtracted from the input data. Two or more models of the data may be created using weights to separate energy between the models in the inversion. The models are updated such that after reverse transformation using the appropriate variable-velocity operators and re-combination in the data domain the result describes the input data in an n-norm sense. Once the model updating is complete, with a suitably small residual on the data, the final transform of all models is made using equation (2). The reverse-transformed modelled data is re-combined to give the complete output dataset with corrections for time-variable water velocity for both primaries and multiples. The final output data are further processed to create an image of the subsurface, to be used to explore for, or help produce, hydrocarbons These new methods and systems for correcting seismic data for water-velocity variations according to the afore-described embodiments can accurately reduce observed data to the equivalent data one would record in a stationary water column. The incorporation of $\Delta t_e$ in the tau-px-py operators described above allows both specular and non-specular energy to be corrected for water-velocity variations at the minor cost of approximating the point of entry of the arrivals at the water-bottom. Consequently, the full wavefield can be corrected with little practical limitation. The approximations required to calculate the point of entry in (11) and equivalent equations for multiple ray-paths are reasonable to make in practice, since the quality of the transform is only moderately sensitive to this parameter. Furthermore, the use of the depth-independent q-values to characterise changes in water velocity allow more accurate measurement of time-varying water velocity since it enables a data averaging step to be performed in variable water depths without degrading the velocity estimate. Accurate estimation of the variable water velocity from seismic data itself reduces reliance on external measures, allowing legacy datasets or other datasets acquired without external measures to be processed with this method.

The correction for time-varying water velocity allows the subsequent processing of seismic data to be more accurate in the relationship between data-modelling processes and the data itself. Examples include migration using an operator designed from a stationary water-column. The result is a cleaner and more tightly focused image of the subsurface, with lower levels of uncancelled migration operator and lower levels of 4D noise when images from baseline and monitor surveys are subtracted.

Figure 12:
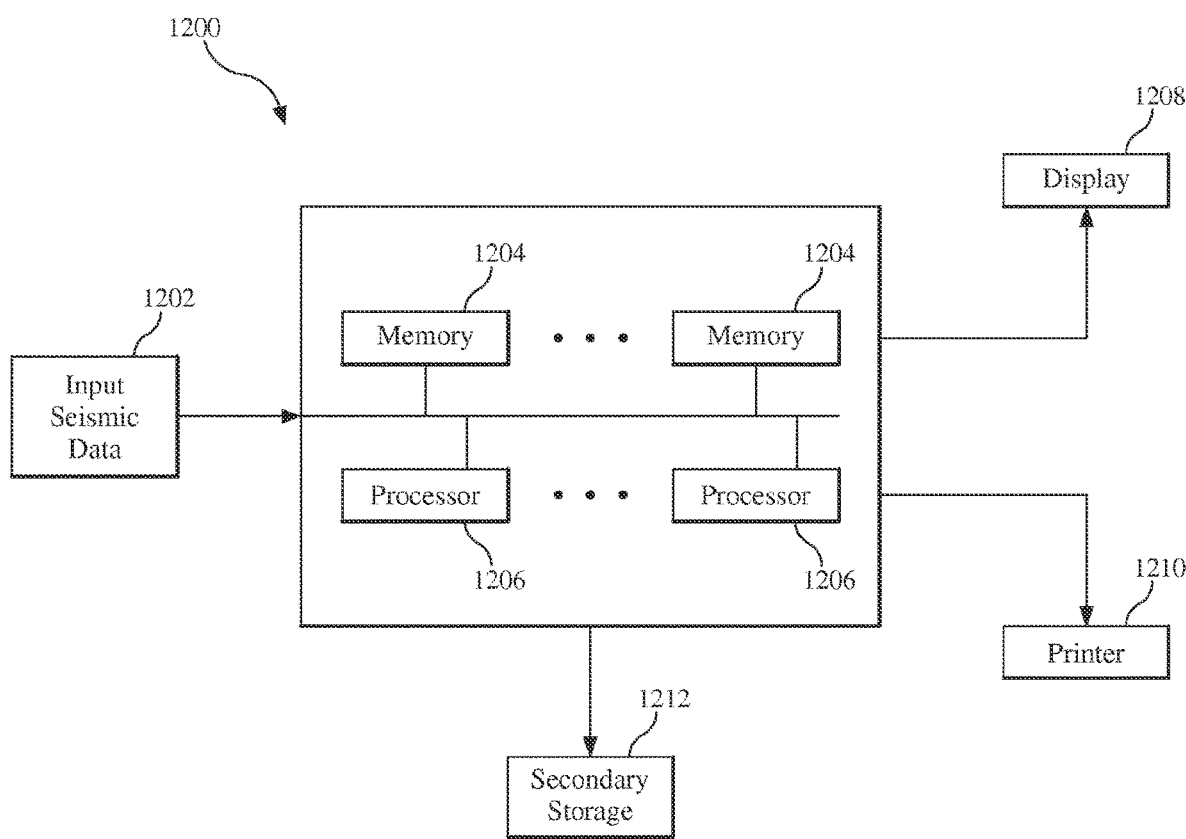
FIG. 12 is a computer system according to an embodiment.

FIG. 12 illustrates a specialized computer system 1200 programmed to correct or compensate input seismic data 1202 for time variations in water velocity using any of the embodiments described above. The input seismic data 1202 can, for example, have been acquired and recorded using a marine seismic acquisition systems such as those illustrated in FIGS. 1 and 2. Thus one or more memory devices 1204 will store the input seismic data 1202 for it to be operated upon using one or more of the techniques described above, which algorithms are encoded in suitable software/computer code that may also be stored in memory devices 1204 for execution by one or more processors 1206, making computer system 1200 a specially programmed computer system. Indeed, it is typical for the processing of seismic data, due to its tremendous volume and the complexity of the numerous algorithms which are run against that data to improve the image of the subsurface being generated, to use massively parallel computing systems or supercomputers to execute the types of algorithms described herein along with numerous other algorithms on each seismic data set. When executed by specially programmed computers 1200, the resulting seismic data can be output as an image of the subsurface on, e.g., a display 1208, or hard copy via printer 1210 or secondary storage medium 1212, e.g, a CD or flash drive, for delivery to the customer which purchased the seismic survey.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, stored in a memory and executing on a processor, for correcting input seismic data for time-variable water velocities comprising the steps of:
    determining traveltime discontinuities in the input seismic data which are associated with the time-variable water velocities;
    transforming the input seismic data from a data space that contains the traveltime discontinuities into a model space which does not contain the traveltime discontinuities; and
    reverse transforming the transformed seismic data from the model space back into the data space,
    wherein the transforming includes using a conjugate gradients solver and an equation which includes operators based on the traveltime discontinuities to estimate the model-domain signal which reverse transforms to give the input seismic data.

2. The method of claim 1, further comprising:
    generating an image of a subsurface from which the input seismic data was recorded based on the reverse transformed seismic data.

3. The method of claim 1, wherein the time-variable water velocities include a first water velocity associated with a subsurface region at a first time and a second water velocity, which is different than the first water velocity, associated with the subsurface region at a second time.

4. The method of claim 1, wherein the step of reverse transforming further comprises:
    using an operator without time variability associated with the traveltime discontinuities to perform the reverse transformation.

5. The method of claim 1, wherein the step of determining further comprises:
    approximating a point-of-entry for each datapoint in the input seismic data; and
    determining extrapolation-time differences between sources used to generate the input seismic data and respective approximated points-of entry to generate the traveltime discontinuities.

6. The method of claim 1, wherein the method is operable to correct both primary waves and multiple waves in the input seismic data for time variable water velocities by:
    generating a set of model-domain weights to separate primary and multiple arrivals during an inversion associated with the conjugate-gradients solver using iteratively re-weighted methods;
    generating two or more models of the seismic data using the set of model-domain weights to separate energy between the models in the inversion; and
    updating the two or more models such that, after reverse transformation using variable-velocity operators and re-combination in a data domain, a result describes the input seismic data.

7. A computer system programmed to correct input seismic data for time-variable water velocities comprising:
    at least one memory device configured to store the input seismic data and computer program instructions; and
    at least one processor for executing the computer program instructions to:
        determine traveltime discontinuities in the input seismic data which are associated with the time-variable water velocities;
        transform the input seismic data from a data space that contains the traveltime discontinuities into a model space which does not contain the traveltime discontinuities; and
        reverse transform the transformed seismic data from the model space back into the data space,
    wherein the processor transforms the seismic data by using a conjugate gradients solver and an equation which includes operators based on the traveltime discontinuities to estimate the model-domain signal which reverse transforms to give the input seismic data.

8. The computer system of claim 7, further comprising:
    an output device configured to generate an image of a subsurface from which the input seismic data was recorded based on the reverse transformed seismic data.

9. The computer system of claim 7, wherein the time-variable water velocities include a first water velocity associated with a subsurface region at a first time and a second water velocity, which is different than the first water velocity, associated with the subsurface region at a second time.

10. The computer system of claim 7, wherein the processor is further configured to perform the reverse transform by using an operator without time variability associated with the traveltime discontinuities to perform the reverse transformation.

11. The computer system of claim 7, wherein the processor is further configured to determining the traveltime discontinuities by:
    approximating a point-of-entry for each datapoint in the input seismic data; and
    determining extrapolation-time differences between sources used to generate the input seismic data and respective approximated points-of entry to generate the traveltime discontinuities.

12. A method, stored in a memory and executing on a processor, for correcting input seismic data for time-variable water velocities, the method comprising:
    transforming input seismic data from a data acquisition space to a model space depending on slant coordinates and enabling decomposition into plane waves, the transforming incorporating travel-time discontinuities;
    compensating for water-column velocity variations by phase-shifting the plane waves to eliminate the travel-time discontinuities;
    reverse transforming recombined phase-shifted plane waves back into the data acquisition domain to obtain seismic data corrected for time-variable water velocities; and
    generating an image of a formation under the seafloor using the seismic data corrected for time-variable water velocities.

13. The method of claim 12, wherein the transforming input seismic data employs normalized weights to account for irregular distribution of the input data.

14. The method of claim 13, wherein the transforming, the compensating and the reverse transforming are treated as an inverse problem using a conjugate gradients solver of a transform $$\begin{pmatrix} d(x_1, y_1, \omega, t_{a_1}) \\ \vdots \\ d(x_N, y_N, \omega, t_{a_N}) \end{pmatrix} =$$

$$\begin{pmatrix} \frac{g_1}{\tilde{g}} e^{-i\omega(p^0_{x_1} x_1 + p^0_{y_1} y_1)} e^{-i\omega \Delta t_e(t_{a_1})} & \cdots & \frac{g_1}{\tilde{g}} e^{-i\omega(p^0_{x_M} x_1 + p^0_{y_M} y_1)} e^{-i\omega \Delta t_e(t_{a_1})} \\ \vdots & \ddots & \vdots \\ \frac{g_N}{\tilde{g}} e^{-i\omega(p^0_{x_1} x_N + p^0_{y_1} y_N)} e^{-i\omega \Delta t_e(t_{a_N})} & \cdots & \frac{g_N}{\tilde{g}} e^{-i\omega(p^0_{x_M} x_N + p^0_{y_M} y_N)} e^{-i\omega \Delta t_e(t_{a_N})} \end{pmatrix}$$

$$\begin{pmatrix} \psi(p^0_{x_1}, p^0_{y_1}, \omega) \\ \vdots \\ \psi(p^0_{x_M}, p^0_{y_M}, \omega) \end{pmatrix}$$

where d is input data, $\psi$ is data in the model space, $\omega$ is a temporal frequency, x and y are spatial positions for $1, \ldots, N$ data traces, $g_k$ is a data weight appropriate for the $k^{th}$ trace, $\tilde{g}$ is the normalization factor, $e^{i\theta}$ for imaginary number i and phase angle $\theta$ is used to define a slanting path, $p_x$ and $p_y$ are slownesses that define slants in x and y spatial dimensions, and $\Delta t_e$ represent travel time discontinuities which are functions of acquisition times $t_{ai}$.

* * * * *